F. WHITNEY.
ROLLER BEARING.
APPLICATION FILED NOV. 23, 1914.
1,182,608.
Patented May 9, 1916.
2 SHEETS—SHEET 2.
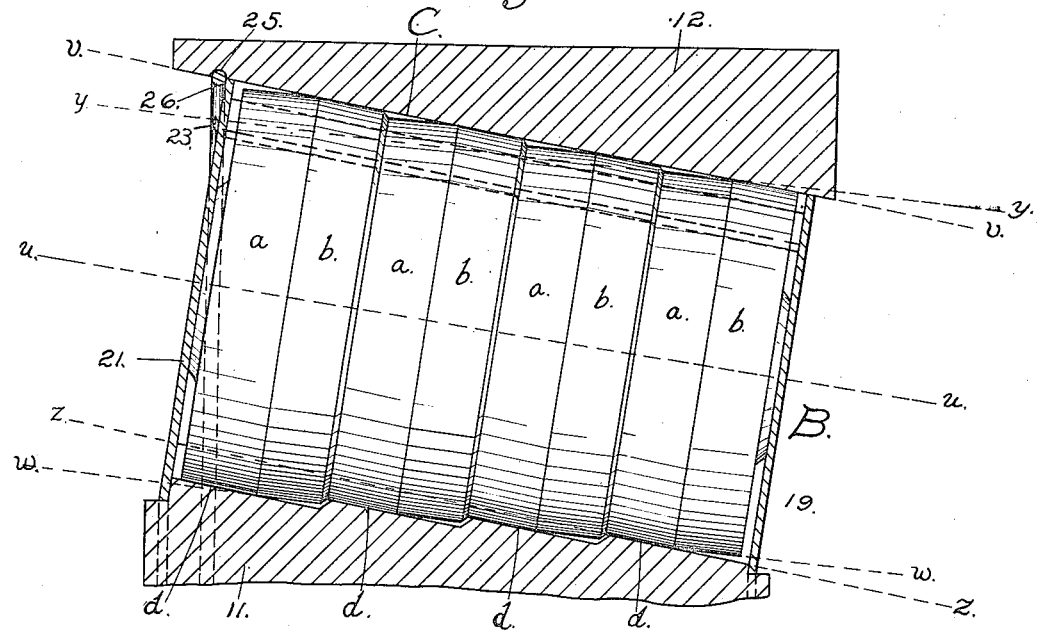
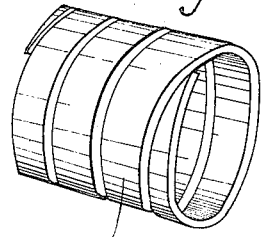
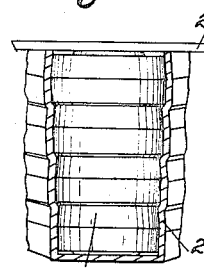
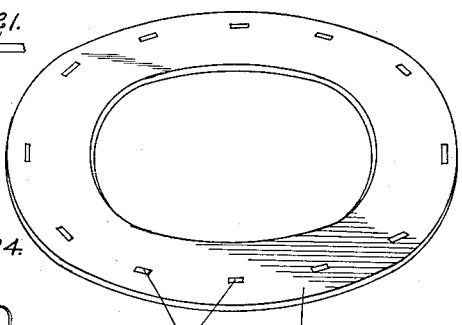
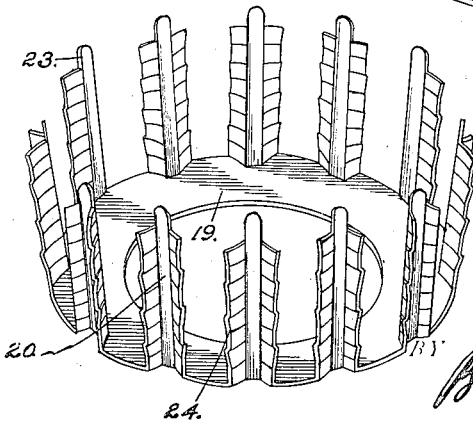

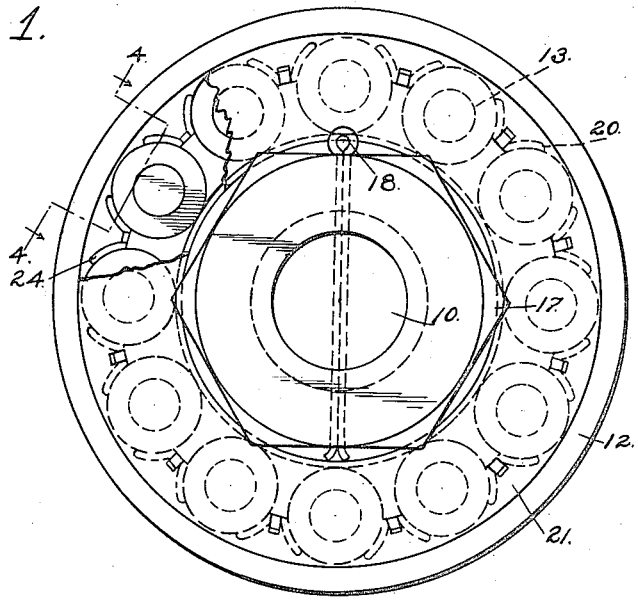
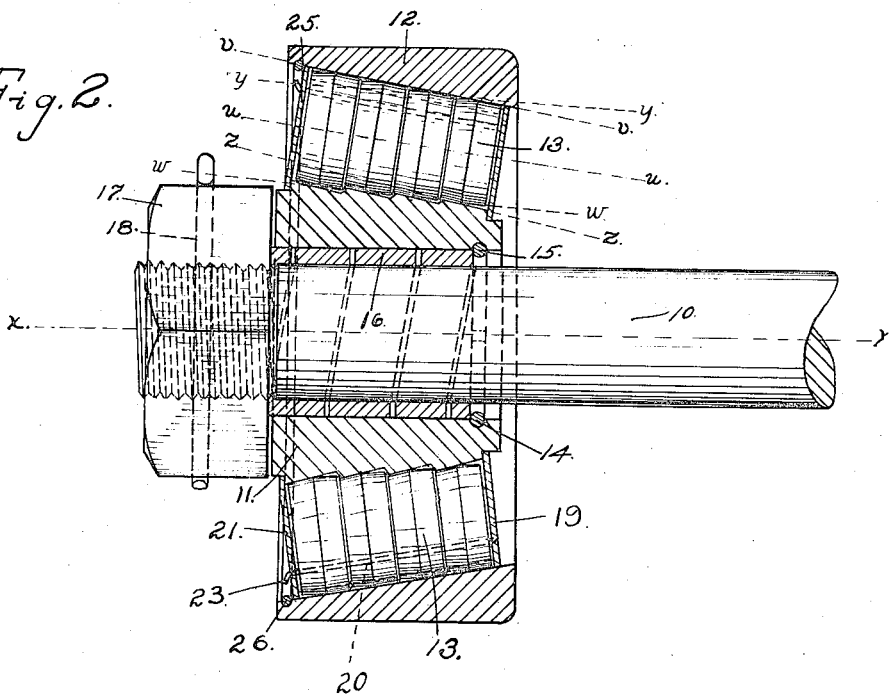

UNITED STATES PATENT OFFICE.

FRANK WHITNEY, OF HUBBARD WOODS, ILLINOIS.

ROLLER-BEARING.

1,182,608.

Specification of Letters Patent.  Patented May 9, 1916.

Application filed November 23, 1914. Serial No. 873,536.

*To all whom it may concern:*

Be it known that I, FRANK WHITNEY, a citizen of the United States, residing at Hubbard Woods, in the county of Cook and State of Illinois, have invented certain new and useful Improvements in Roller-Bearings, of which the following is a specification.

My invention relates to roller bearings of the type in which the rollers are conical or tapered in their configuration.

One of the principal objects of the invention is to provide a roller bearing of this type in which the rollers, and the elements between which they are interposed, are formed with bearing surfaces arranged so that the rollers are not subjected to the longitudinal thrust, tending to displace them endwise, to which the rollers of this type of bearing are subjected because of the conical shape of the rollers. If a roller in the form of a frustum of a cone is arranged between conical bearing surfaces, the thrust of the latter on the rollers necessarily has a longitudinal component which has to be resisted in order to prevent the displacement of the roller. For this reason it has been usual, in bearings of this type, to provide an abutment for the large ends of the rollers, for example, by forming one of the bearing cones with a shoulder. This expedient is objectionable in that the engagement between the rollers and the shoulder being always on one side of the axes of the rollers, the latter are thrust out of proper alinement and cramped, to a certain extent, between the cones. If this cramping action takes place even in the slightest degree, the freedom of movement of the revoluble elements of the bearing is lessened and the bearing surfaces eventually cut and worn so as to decrease the life of the bearing. My invention overcomes this defect by providing an arrangement of bearing surfaces which eliminates the longitudinal thrust, or rather, divides the component into a number of forces exerted in opposite directions so that they counteract each other.

A further object of the invention is to provide an improved form of cage or housing for mounting the rollers in the bearing which will be strong, light and may be cheaply manufactured.

A further object of the invention is to provide an arrangement whereby the housing for the rollers incloses and engages the inner bearing cone so that housing, cone and rollers form a single structure that may be removed from the bearing without danger of having the rollers fall out and get lost.

A further object of the invention is to provide a novel form of elastic sleeve for automatically maintaining the proper adjustment between the bearing elements and the rollers which is disposed so that its use does not necessitate lengthening the shaft beyond the bearing to any appreciable extent. In other words, this spring take-up device permits the nut on the end of the shaft to be screwed down almost to the bearing.

As incidental to the configuration of the rollers and bearing elements by means of which longitudinal thrust is eliminated, spaces are provided between the successive pairs of co-engaging bearing faces into which foreign matter, such as dust, and the like, will be forced from said bearing faces. This eliminates or minimizes one cause of wear of the bearing surfaces. These spaces serve also as lubricant ducts.

The invention has for further objects such other novel and improved constructions, arrangements and devices relating to roller bearings as will be hereinafter described and claimed.

The invention is illustrated, in a preferred embodiment, in the accompanying drawings wherein—

Figure 1 is an end elevation of a bearing constructed in accordance with the invention; Fig. 2, a longitudinal section thereof; Fig. 3, a fragmentary longitudinal section, on a larger scale, through adjacent portions of the inner and outer bearing elements, one of the rollers being shown in elevation; Fig. 4, a detail sectional view on line 4—4 of Fig. 1. Fig. 5, a view in perspective, of the roller cage before the outer end plate is put in place; Fig. 6, a view, in perspective, of the outer end plate of the cage, and Fig. 7, a similar view of the helical spring sleeve for maintaining proper adjustment between the bearing cones and the rollers.

Like characters of reference designate like parts in the several figures of the drawings.

Referring to the drawings, 10 designates a shaft, 11 an inner bearing element or cone, 12 an outer bearing element, and 13 rollers, interposed between said bearing elements, which may be either hollow or solid, as desired. The inner bearing element is formed on its inner surface with a circumferential groove 14 in which is arranged a split elastic ring 15 which provides an abutment for a helical spring take-up sleeve 16. The latter makes a close fit between shaft 10 and the inner bearing cone 11, and is kept under compression by a nut 17 on shaft 10. The nut may be held in place by the usual cotter pin 18. By using sleeves made of material of different thicknesses the same bearing may be used on shafts of different diameters; or to accommodate the bearing for a still larger shaft the sleeve may be omitted, the ring 15 removed and the adjustment of the cones obtained in other well known ways. It will be seen, therefore, that by these expedients the expense of making the bearings in a variety of different sizes may be avoided.

The rollers 13 are preferably arranged in a cage (Figs. 5 and 6) consisting of an annular plate 19 formed with outstanding spacing members 20 and an annular plate 21 formed with slots 22 to receive lugs 23 on the ends of the spacing members 20, the lugs being bent over, as shown in Figs. 1 and 2, to hold plate 22 in place on the other element of the cage. The spacing members 20 are formed with curved wings 24 providing bearing faces for the rollers 13, and the entire structure is preferably made of sheet metal and formed into shape by cutting and pressing. The outer ring or plate 21 may also be a stamping so that the cage structure may be produced very economically. The inner bearing member 11 is formed with shoulders $11^a$, $11^b$ which are engaged by the plates 19, 21, the inner bearing member being thus inclosed in the housing together with the rollers when the housing is assembled. The outer bearing member 12 is preferably formed with an interior circumferential groove 25 to receive an elastic split ring 26 which serves to hold the roller cage with the rollers and inner bearing members thereon, in place in the outer bearing member. The bearing therefore forms a complete self-contained structure which may be handled as a unit. This is a matter of convenience particularly in shipping the bearing.

In order to eliminate longitudinal thrust on the rollers the latter are formed, in each case, with two sets of preferably alternating bearing faces $a$ and $b$ which converge in opposite directions toward the axial line $u$—$u$ of the roller. The bearing surface $c$ of one of the bearing elements, for example, that of the outer bearing element 12, is a continuous conical surface having the same inclination with respect to the axis of the roller as bearing surfaces $b$. The other bearing element, the element 11 in the case assumed, is formed with a plurality of raised tracks providing bearing surfaces $d$ which have the same angular relation to the axis of the roller as the bearing surfaces $a$ which bear against them. The bearing surfaces $a$—$d$ are parallel with the bearing surfaces $c$—$b$; or, in other words, the angles between the bearing surfaces $a$—$d$ and the axis of the roller are the same as between the bearing surfaces $b$—$c$ and the axis of the roller, the two sets of bearing surfaces converging toward, or diverging from, the axis in opposite directions. The lines $v$—$v$ and $w$—$w$ define the taper of the roller and the angular relationship between the bearing surfaces on the outer and inner cones. If the angular distance between the axial line $u$—$u$ of the roller and lines $w$—$w$ and $v$—$v$ is, in each instance, two and one-half degrees, for example, the angular distance between line $v$—$v$ and a line $y$—$y$, defining the convergence of one of the faces $a$, will be two and one-half degrees. Similarly a line $z$—$z$ drawn through one of the bearing faces $d$ on the inner cone will stand at two and one-half degrees from line $w$—$w$. It will be observed that the lines $v$—$v$ and $z$—$z$ indicating the angle of the bearing faces on the outer and inner cone respectively, are parallel and both inclined with respect to the axial line $x$—$x$ of the bearing. By this arrangement the longitudinal component of the thrust of the bearing cones against the roller is divided into a number of forces of equal moment acting in opposite directions and therefore counteracting each other so that the roller has no tendency to be displaced in the direction of its length. The lines of contact between each roller and the opposed bearing elements are parallel instead of being oblique as in the ordinary conical roller bearing. On the other hand, the rollers are tapered and the bearing surfaces of the opposed bearing elements conical so that the bearing has the take-up feature which is the characteristic advantage of the conical roller bearing. In short, the structure combines the advantage of the cylindrical roller bearing with that of the conical roller bearing.

Preferably the wings 24 of the spacing elements 20 of the roller cage have contours corresponding to the contours of the rollers bearing against them.

While I have described my invention in a preferred embodiment, it will be understood that modifications in the form, construction and arrangement of the parts constituting the bearing might be devised without departure from the principles of the invention. Therefore I do not wish to be understood as limiting the invention to the exact devices, constructions and arrangements shown.

I claim:

1. In a roller bearing, the combination with rollers the axes of which converge to a common point and formed each with three or more bearing surfaces which converge toward the axis of the roller alternately in opposite directions, of bearing elements between which said rollers are interposed formed with bearing surfaces corresponding, respectively, with the oppositely converging surfaces on said rollers.

2. In a roller bearing, the combination with rollers the axes of which converge to a common point and formed each with three or more bearing surfaces which converge toward the axis of the roller alternately in opposite directions, of bearing elements between which said rollers are interposed formed with bearing surfaces corresponding, respectively, with the oppositely converging surfaces on said rollers, and spacing elements between said rollers having the contour thereof.

3. In a roller bearing, the combination with rollers the axes of which converge to a common point and formed each with three or more bearing surfaces which converge toward the axis of the roller alternately in opposite directions, of bearing elements between which said rollers are interposed formed with bearing surfaces corresponding, respectively, with the oppositely converging surfaces on said rollers, and a cage in which said rollers are mounted provided with spacing elements having the contour of said rollers.

4. In a roller bearing, the combination with rollers the axes of which converge to a common point and formed each with three or more bearing surfaces which converge toward the axis of the roller alternately in opposite directions, of bearing elements between which said rollers are interposed formed with bearing surfaces corresponding, respectively, with the oppositely converging surfaces on said rollers, and a cage which incloses said rollers and the inner bearing element forming therewith a single structure and removable as such from the outer bearing member.

5. In a roller bearing, the combination with rollers the axes of which converge to a common point and formed each with three or more bearing surfaces which converge toward the axis of the roller in opposite directions but at equal angles, of bearing elements between which said rollers are interposed provided with bearing surfaces corresponding, respectively, with the oppositely converging surfaces on said rollers.

6. In a roller bearing, the combination with tapered rollers the axes of which converge to a common point and formed each with a plurality of bearing surfaces which converge toward the axis of the roller alternately in opposite directions, of bearing elements between which said rollers are interposed formed with bearing surfaces corresponding, respectively, with oppositely converging surfaces on said rollers.

7. In a roller bearing, the combination with tapered rollers formed each with a plurality of bearing surfaces which converge toward the axis of the roller in opposite directions, of bearing elements between which said rollers are interposed, one having a continuous bearing surface corresponding with one set of bearing surfaces on the rollers, and the other element formed with interrupted bearing surfaces corresponding with the oppositely convergent set of surfaces on the rollers.

8. In a roller bearing, the combination with tapered rollers formed each with a plurality of bearing surfaces which converge toward the axis of the roller in opposite directions, of bearing elements between which said rollers are interposed, one having a bearing surface for one set of bearing surfaces on the rollers which is continuously convergent toward the axis of the bearing, the other element formed with interrupted bearing surfaces for the other set of bearing surfaces on the rollers convergent toward the axis of the bearing on lines parallel with the bearing surface of the first named element.

9. In a roller bearing, the combination with tapered rollers formed each with interrupted convergent bearing surfaces and between the same with bearing surfaces oppositely convergent but at equal angles with the axis of the roller, of bearing elements between which the rollers are interposed, one formed with a continuous convergent bearing surface conforming to the bearing surfaces on the rollers which define the taper thereof, and the other formed with interrupted bearing surfaces conforming with the alternate bearing surfaces on the rollers.

10. In a roller bearing, the combination with tapered rollers formed each with interrupted convergent bearing surfaces and between the same with bearing surfaces oppositely convergent but at equal angles with the axis of the roller, of bearing elements between which the rollers are interposed, one formed with a continuous convergent bearing surface conforming to the bearing surfaces on the rollers which define the taper thereof, and the other formed with interrupted bearing surfaces conforming with the alternate bearing surfaces on the rollers, and spacing elements between the rollers having the contour of the same.

11. In a roller bearing, the combination with tapered rollers formed each with interrupted convergent bearing surfaces and between the same bearing surfaces oppositely convergent but at equal angles to the axis of the roller, a cage provided with end plates and spacing elements, an inner bearing element, said element and rollers being arranged in said cage between said plates, and an outer bearing element inclosing the cage, one of said elements being formed with continuous convergent bearing surfaces conforming to the bearing surfaces on the rollers defining the taper thereof and the other with interrupted bearing surfaces conforming with the alternate bearing surfaces on said rollers.

12. The combination with a shaft, of a roller bearing comprising tapered rollers formed each with a plurality of bearing surfaces which converge toward the axis of the roller in opposite directions, inner and outer bearing elements between which said rollers are interposed formed with bearing surfaces corresponding, respectively, with the oppositely converging bearing surfaces on said rollers, a helical spring sleeve interposed between said shaft and the inner bearing member and abutting against the latter, and a nut on the shaft to compress said spring sleeve.

13. In a roller bearing, the combination with tapered rollers formed each with interrupted convergent bearing surfaces and between the same bearing surfaces oppositely convergent but at equal angles to the axis of the roller, a cage provided with end plates and spacing elements which have a configuration conforming to that of the rollers, an inner bearing element, said element and rollers being arranged in said cage between said plates, and an outer bearing element inclosing the cage, one of said elements being formed with continuous convergent bearing surfaces conforming to the bearing surfaces on the rollers defining the taper thereof, and the other with interrupted bearing surfaces conforming with the alternate bearing surfaces on said rollers.

14. In a roller bearing, the combination with tapered rollers formed each with three or more conical bearing surfaces which alternately converge and diverge with respect to the axis of the roller, of bearing elements between which said rollers are interposed formed with conical bearing surfaces corresponding respectively with the surfaces on said rollers.

15. In a roller bearing, the combination with tapered rollers formed each with three or more conical bearing surfaces which alternately converge and diverge at equal angles with respect to the axis of the roller, of bearing elements between which said rollers are interposed formed with conical bearing surfaces corresponding, respectively, with the surfaces on said rollers.

16. In a roller bearing, the combination with tapered rollers formed each with a plurality of conical bearing surfaces oppositely inclined with respect to the axis of the roller, of bearing elements between which said rollers are interposed formed one with a continuous conical bearing surface and the other with interrupted conical bearing surfaces formed on lines parallel to said continuous conical bearing surface.

17. In a roller bearing, the combination with tapered rollers formed each with a plurality of conical bearing surfaces oppositely inclined at equal angles with respect to the axis of the roller, of bearing elements between which said rollers are interposed formed one with a continuous conical bearing surface and the other with interrupted conical bearing surfaces formed on lines parallel to said continuous conical bearing surface.

18. In a roller bearing, the combination with tapered rollers formed each with interrupted conical bearing surfaces and between the same with conical bearing surfaces oppositely convergent but at equal angles with the axis of the roller, of bearing elements between which the rollers are interposed, one formed with a continuous conical bearing surface conforming to the bearing surfaces on the rollers which define the taper thereof, and the other formed with interrupted conical bearing surfaces conforming with the alternate bearing surfaces of the rollers.

19. In a roller bearing, the combination with tapered rollers formed each with interrupted conical bearing surfaces and between the same with conical bearing surfaces oppositely convergent but at equal angles with the axis of the roller, of bearing elements between which the rollers are interposed, one formed with a continuous conical bearing surface conforming to the bearing surfaces on the rollers which define the taper thereof, and the other formed with interrupted conical bearing surfaces conforming with the alternate bearing surfaces of the rollers, and spacing elements between said rollers, the contour of which conforms to the contour of said rollers.

20. The combination with a shaft, of a roller bearing comprising outer and inner bearing elements and rollers interposed between the same, a helical spring sleeve interposed between the inner bearing element and the shaft, means providing a removable abutment for said sleeve on the inner bearing member, and a fixed stop on the shaft to hold said sleeve under compression.

21. The combination with a shaft, of a roller bearing comprising outer and inner bearing elements and rollers interposed between the same, a helical spring sleeve interposed between the inner bearing element and the shaft, said inner bearing element being formed with a circumferential groove on its inner surface, and a split elastic ring fitted into said groove against which said spring sleeve abuts.

22. In a roller bearing, the combination with an outer bearing element of a roller cage arranged within the same, an inner bearing element and rollers between the inner and outer bearing elements, said inner bearing element and rollers being retained by the cage in operative position therein, and means for engaging the cage with the outer bearing element so that the whole forms a unitary, self-contained bearing structure complete in itself.

23. In a roller bearing, the combination with an outer bearing element having an internal conical bearing surface, a roller cage arranged within the same comprising end plates and spacing elements, a tapered inner bearing element, conical rollers between the same and the outer bearing element, the inner bearing element as well as the rollers being held in position between the end plates of the cage, and an elastic removable element adapted to hold said cage in position in the outer bearing element.

24. In a roller bearing, the combination with an outer bearing element, a roller cage arranged within the same comprising end plates and spacing elements, an inner bearing element, rollers between the same and the outer bearing element, the inner bearing element as well as the rollers being held in position between the end plates of the cage, an elastic removable element adapted to hold said cage in position in the outer bearing element, a shaft, a helical spring sleeve arranged between the shaft and the inner bearing element and abutting against the latter, and a nut on said shaft to compress said sleeve.

25. The combination with a shaft, of a roller bearing comprising an inner conical roller bearing element, an outer bearing element having a conical inner face, a plurality of rollers, and a cage comprising spacers which stand between the successive rollers and annular end plates engaging said inner bearing element so as to hold the same in fixed relation with the rollers, a helical spring sleeve interposed between the inner bearing element and the shaft, said inner bearing element being formed with a groove, a split ring which seats in said groove providing an abutment for said sleeve, and a nut on said shaft which compresses said sleeve.

26. The combination with a shaft, of a roller bearing comprising an inner conical bearing element, an outer bearing element having a conical inner face, a plurality of rollers, a cage comprising spacers which stand between the successive rollers and annular end plates engaging said inner bearing element so as to hold the same in fixed relation with the rollers, a helical spring sleeve interposed between the inner bearing element and the shaft, said inner bearing element being formed with a groove, a split ring which seats in said groove providing an abutment for said sleeve, a nut on said shaft which compresses said sleeve, said rollers being tapered and formed with conical bearing surfaces oppositely inclined at equal angles with respect to the axes of the rollers and one of said bearing elements being formed with continuous conical bearing surfaces conforming to one set of bearing surfaces on the rollers, the other bearing element being formed with interrupted conical bearing surfaces conforming to the other set of bearing surfaces on the rollers.

27. In a roller bearing, the combination of a plurality of rollers; a cage for the same comprising a pair of annular plates arranged at opposite ends of the rollers against which the ends of the rollers bear, and spacing elements between the rollers which unite the plates; an inner bearing element which is arranged between and is held in position by said plates; an outer bearing element; and means for engaging the cage with said outer bearing element whereby the bearing forms a single unitary structure which can be handled as such.

28. In a roller bearing, the combination with inner and outer bearing elements, of rollers interposed between the same, a housing and spacing structure for the rollers comprising a sheet metal annular plate and integrally formed outstanding spacing members provided with oppositely disposed bearing faces for the rollers and with bendable lugs at their outer ends, and an annular inclosing plate having perforations through which said lugs extend.

29. In a roller bearing, the combination with inner and outer bearing elements, of rollers interposed between the same, said rollers and bearing elements being formed with oppositely convergent bearing surfaces, a housing and spacing structure for the rollers comprising a sheet metal annular plate and integrally formed outstanding spacing members provided with oppositely disposed bearing faces for the rollers conforming in configuration to the configuration of said rollers, and an annular inclosing plate secured to said spacing members.

30. In a roller bearing, the combination with tapered rollers formed each with interrupted convergent bearing surfaces and between the same with bearing surfaces oppositely convergent but at equal angles with the axis of the roller, of bearing elements between which the rollers are interposed, one formed with a continuous bearing surface conforming to the bearing surfaces on the rollers which define the taper thereof, and the other formed with interrupted bearing surfaces with which the alternate bearing surfaces on the rollers are in contact.

31. In a roller bearing, the combination with inner and outer bearing elements, one having a continuous conical bearing surface and the other interrupted bearing surfaces, of a plurality of tapered rollers interposed between said elements, each of which has a plurality of bearing surfaces which bear upon one of said bearing elements and a plurality of surfaces which bear upon the other element.

32. A roller bearing comprising outer and inner bearing elements, the inner element being formed on its inner surface with a circumferential groove, rollers interposed between said bearing members, a helical spring sleeve within the inner bearing member, and a split spring ring in said groove to hold said sleeve in place.

33. As an article of manufacture, a roller for a roller bearing which is generally conical in shape and formed with three or more annular bearing surfaces which alternately converge and diverge with respect to the axis of the roller.

34. As an article of manufacture, a hollow roller for a roller bearing which is generally conical in shape and formed with three or more annular bearing surfaces which alternately converge and diverge with respect to the axis of the roller.

35. A roller bearing comprising a plurality of rollers generally conical in shape and formed with a plurality of non-continuous, annular bearing surfaces, inner and outer bearing elements, one of which is formed with a continuous conical bearing surface and the other with a bearing surface generally conical in shape made up of a plurality of non-continuous annular surfaces, a housing which incloses said rollers and inner bearing element, and means for retaining said housing within said outer bearing element.

FRANK WHITNEY.

Witnesses:
G. Y. SKINNER,
S. A. FALKENBERG.